(12) United States Patent
Kay et al.

(10) Patent No.: US 12,026,509 B2
(45) Date of Patent: Jul. 2, 2024

(54) DYNAMIC REVIEW OF SOFTWARE UPDATES AFTER PULL REQUESTS

(71) Applicant: Capital One Services, LLC, McLean, VA (US)

(72) Inventors: Tallulah Kay, Los Altos, CA (US); Benjamin Simon, Washington, DC (US); Christina Kim, Sam Ramon, CA (US); Naveed Khan, Bowie, MD (US); Ahmad Hassan Ibrahim, Centreville, VA (US); Jean-Etienne Lavallee, Richmond, VA (US); George Swain, Arlington, VA (US); Steven Almanzar, Arlington, VA (US); Andrew Kim, Fairfax, VA (US); Dominic Leone, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/146,004

(22) Filed: Dec. 23, 2022

(65) Prior Publication Data
US 2023/0130527 A1    Apr. 27, 2023

Related U.S. Application Data

(63) Continuation of application No. 17/140,748, filed on Jan. 4, 2021, now Pat. No. 11,537,392.

(51) Int. Cl.
*G06F 9/44* (2018.01)
*G06F 8/20* (2018.01)
(Continued)

(52) U.S. Cl.
CPC ............. *G06F 8/71* (2013.01); *G06F 8/20* (2013.01); *G06F 8/73* (2013.01); *G06F 9/451* (2018.02)

(58) Field of Classification Search
CPC ..... G06F 8/71; G06F 8/20; G06F 8/73; G06F 9/451
See application file for complete search history.

(56) References Cited

U.S. PATENT DOCUMENTS

| 8,566,369 B2 | 10/2013 | Rousseau et al. |
| 10,459,697 B1 | 10/2019 | Metwally et al. |

(Continued)

FOREIGN PATENT DOCUMENTS

| CN | 105095348 B | * | 3/2019 | ............. G06F 16/21 |
| CN | 109711145 A | * | 5/2019 | |

(Continued)

OTHER PUBLICATIONS

Akshay Kalyan, A Collaborative Code Review Platform for GitHub, 2016, pp. 1-6. https://ieeexplore.ieee.org/stamp/stamp.jsp?tp=&arnumber=7816585 (Year: 2016).*

(Continued)

*Primary Examiner* — Mongbao Nguyen
(74) *Attorney, Agent, or Firm* — Harrity & Harrity, LLP (57) ABSTRACT

In some implementations, a system may receive, from a software repository, a difference file indicating changes, to software code, that was submitted to the software repository. The system may parse the difference file to determine files, associated with the software code, affected by the changes and to determine content associated with the changes. The system may apply rules, from a rule dictionary, based on comparing identifiers, associated with the files, with identifiers included in the rules and based on comparing the content, associated with the changes, with content included in the rules. The system may generate software review checklist items based on applying the rules and output the software review checklist items for display. The system may receive, based on input from a user, confirmation of the (Continued)

changes and commit the changes to the software repository based on the confirmation.

20 Claims, 7 Drawing Sheets

(51) Int. Cl.
*G06F 8/71* (2018.01)
*G06F 8/73* (2018.01)
*G06F 9/445* (2018.01)
*G06F 9/451* (2018.01)
*G06F 9/455* (2018.01)

(56) References Cited

U.S. PATENT DOCUMENTS

| | | | |
|---|---|---|---|
| 10,489,144 | B1 | 11/2019 | Minnis et al. |
| 10,768,929 | B1* | 9/2020 | Turner ............... G06F 8/38 |
| 10,831,471 | B2* | 11/2020 | Swierc ............... G06N 5/025 |
| 11,188,313 | B1 | 11/2021 | Huffman et al. |
| 11,392,844 | B1* | 7/2022 | Rao .................. G06N 20/00 |
| 11,537,392 | B2 | 12/2022 | Kay et al. |
| 11,714,629 | B2* | 8/2023 | Shaastry ............. G06F 8/71 717/168 |
| 2008/0295085 | A1 | 11/2008 | Rachamadugu et al. |
| 2014/0173559 | A1 | 6/2014 | Tiwari et al. |
| 2016/0070568 | A1 | 3/2016 | Balachandran |
| 2017/0060936 | A1 | 3/2017 | Gammans |
| 2017/0090915 | A1 | 3/2017 | Shlosberg |
| 2018/0113862 | A1 | 4/2018 | Glover |
| 2019/0227902 | A1* | 7/2019 | Cheng ............... G06F 11/3608 |
| 2019/0228319 | A1 | 7/2019 | Gupta et al. |
| 2019/0339967 | A1* | 11/2019 | Moondhra ........... G06F 16/2246 |
| 2020/0125480 | A1 | 4/2020 | Sathyamoorthy et al. |
| 2020/0341755 | A1 | 10/2020 | Woulfe |
| 2020/0356635 | A1 | 11/2020 | Szturo et al. |
| 2021/0124561 | A1 | 4/2021 | Pezaris |
| 2021/0141718 | A1 | 5/2021 | Sandhu et al. |
| 2021/0157770 | A1 | 5/2021 | Modeo et al. |
| 2022/0043779 | A1* | 2/2022 | Maddila ............. G06F 40/197 |
| 2022/0131865 | A1* | 4/2022 | Lev Ran ............ H04L 41/0869 |

FOREIGN PATENT DOCUMENTS

| | | | | |
|---|---|---|---|---|
| CN | 110134613 | A | * 8/2019 | .......... G06F 11/3604 |
| CN | 111782517 | A | * 10/2020 | |
| FR | 2907934 | A1 | 5/2008 | |
| WO | 2018104925 | A1 | 6/2018 | |

OTHER PUBLICATIONS

Yuting Chen, A Tool-Supported Review Approach to Detecting Structural Consistency Violations, 2006, pp. 1-10. https://ieeexplore.ieee.org/stamp/stamp.jsp?tp=&arnumber=1690361 (Year: 2016).*

Robert Chatley, Diggit: Automated Code Review via Software Repository Mining, 2018, pp. 567-571. https://ieeexplore.ieee.org/stamp/stamp.jsp?tp=&arnumber=8330261 (Year: 2018).*

Syed Fatiul Huq, Understanding the Effect of Developer Sentiment on Fix-Inducing Changes: An Exploratory Study on GitHub Pull Requests, 2019, pp. 1-8. https://ieeexplore.ieee.org/stamp/stamp.jsp?tp=&arnumber=8945613 (Year: 2019).*

Garyfallidis E., et al., "Dipy, a Library for the Analysis of Diffusion MRI data," Frontiers in Neuroinformatics, Feb. 2014, vol. 8, Article 8, 17 pages.

Hu Z., et al., "Open-Source Sollware in Class: Students' Common Mistakes," 2018 ACM/IEEE 40th International Conference on Software Engineering: Software Engineering Education and Training, ICSE-SEET'18, May 27-Jun. 3, 2018, 9 pages.

Kalyan et al., "A Collaborative Code Review Platform for GitHub," IEEE 2016 21st International Conference on Engineering of Complex Computer Systems (ICECCS), Nov. 6, 2016, pp. 191-196, Retrieved from the Internet: [URL: https://ieeexplore.ieee.org/stamp/stamp.jsp?tp=arnumber=7816585].

Li et al., "Redundancy, Context, and Preference: An Empirical Study of Duplicate Pull Requests in OSS Projects," IEEE Transactions on Software Engineering, Aug. 24, 2020, pp. 1-28, Retrieved from the Internet: [URL: https://ieeexplore.ieee.org/stamp/stamp.jsp?tp=arnumber=9174755].

Liu Z., et al., "Automatic Generation of Pull Request Descriptions," 34th IEEE/ACM International Conference on Automated Sollware Engineering, Sep. 16, 2019, 13 pages.

* cited by examiner

DYNAMIC REVIEW OF SOFTWARE UPDATES AFTER PULL REQUESTS

RELATED APPLICATION

This application is a continuation of U.S. patent application Ser. No. 17/140,748, filed Jan. 4, 2021 (now U.S. Pat. No. 11,537,392), which is incorporated herein by reference in its entirety.

BACKGROUND

Software repositories, such as Github®, store files that include software code for various software projects. Many software projects are developed by a team, where an individual team member may store at least some of those files locally, and the team member may update the code in those locally stored files (e.g., for debugging, to add new features, and so on). The team member may then input a change request to commit the locally stored files to the repository. Some software repositories then automatically generate a pull request based on one or more changes to the software code resulting from the commit. The team member usually needs to confirm the results of the pull request before the commit is completed.

SUMMARY

In some implementations, a system for rule-based review of software code changes includes one or more memories; and one or more processors, communicatively coupled to the one or more memories, configured to: receive, from a software repository, a difference file indicating at least one change, to software code, that was submitted to the software repository; parse the difference file to determine one or more files, associated with the software code, affected by the at least one change; select a rule dictionary that identifies one or more rules associated with software code changes; apply the one or more rules to generate one or more software review checklist items, wherein at least two different rule dictionaries cause generation of different software review checklist items; output a graphical user interface (GUI) that provides the one or more software review checklist items for display; receive, based on input from a user and using the GUI, confirmation of the at least one change; and commit the at least one change to the software repository based on the confirmation of the at least one change.

In some implementations, a method of rule-based review of software code changes includes receiving, from a software repository, a difference file indicating at least one change, to software code, that was submitted to the software repository; parsing the difference file to determine one or more files, associated with the software code, affected by the at least one change and to determine content associated with the at least one change; applying one or more rules, from a rule dictionary, based on comparing one or more identifiers, associated with the one or more files, with one or more identifiers included in the one or more rules and based on comparing the content, associated with the at least one change, with content included in the one or more rules, wherein at least two different rule dictionaries have rules including different identifiers or different content; generating one or more software review checklist items based on applying the one or more rules; outputting the one or more software review checklist items for display; receiving, based on input from a user, confirmation of the at least one change; and committing the at least one change to the software repository based on the confirmation.

In some implementations, a non-transitory computer-readable medium storing a set of instructions includes one or more instructions that, when executed by one or more processors of a device, cause the device to: receive, from a software repository, an application programming interface (API) call that was triggered by at least one change, to software code, that was submitted to the software repository; receive, from the software repository, a difference file indicating the at least one change; schedule, using a load balancer, execution of a parser to apply to the difference file; parse the difference file, using the parser, to determine one or more files, of the software code, affected by the at least one change; schedule, using the load balancer, execution of a checklist generator to apply to the parsed difference file; apply one or more rules, from a rules dictionary and using the checklist generator, to generate one or more software review checklist items, wherein at least two different rule dictionaries cause generation of different software review checklist items; and output, to the software repository, the one or more software review checklist items for display.

DETAILED DESCRIPTION

The following detailed description of example implementations refers to the accompanying drawings. The same reference numbers in different drawings may identify the same or similar elements.

When a user, such as a software developer, generates a pull request to submit new or modified code to a main software repository for a software project, some software repositories present a checklist to the user. Accordingly, the user will review the checklist before confirming the results of the pull request to finalize a commit and include the new or modified code in the software repository. However, such checklists are generic (e.g., the same checklist is presented for all pull requests regardless of the new or modified code submitted by the user) and thus are often ignored by the user. In addition, it is not practical to request that the user confirm each item on a generic checklist before committing a code change from the user to the software repository because not each item is relevant to the code change.

Some implementations described herein enable dynamic generation of a checklist based on specific information associated with the pull request and/or the code change. By dynamically generating a checklist based on each pull request, the software repository can provide a custom checklist that is based on changes to software code written by a user. Moreover, in some implementations, the software repository can request that the user confirm each item on the custom checklist because each item will be based on, and thus relevant to, the changes, which can result in better software code with fewer bugs. In some implementations, computerized rules may determine software review checklist items based on comparing identifiers, associated with files including the changes to the software code, with identifiers included in the rules and/or based on comparing content, associated with the changes to the software code, with content included in the rules. As a result, the software repository may output a checklist with increased relevance with respect to the changes and that improves the user's experience with the software repository. In some implementations, computerized rules may further select from different rule dictionaries based on an identifier for a team associated with the software code or for a project associated with the software code. As a result, the software repository may automatically generate relevant checklists for multiple teams and/or multiple projects.

Figure 1A:
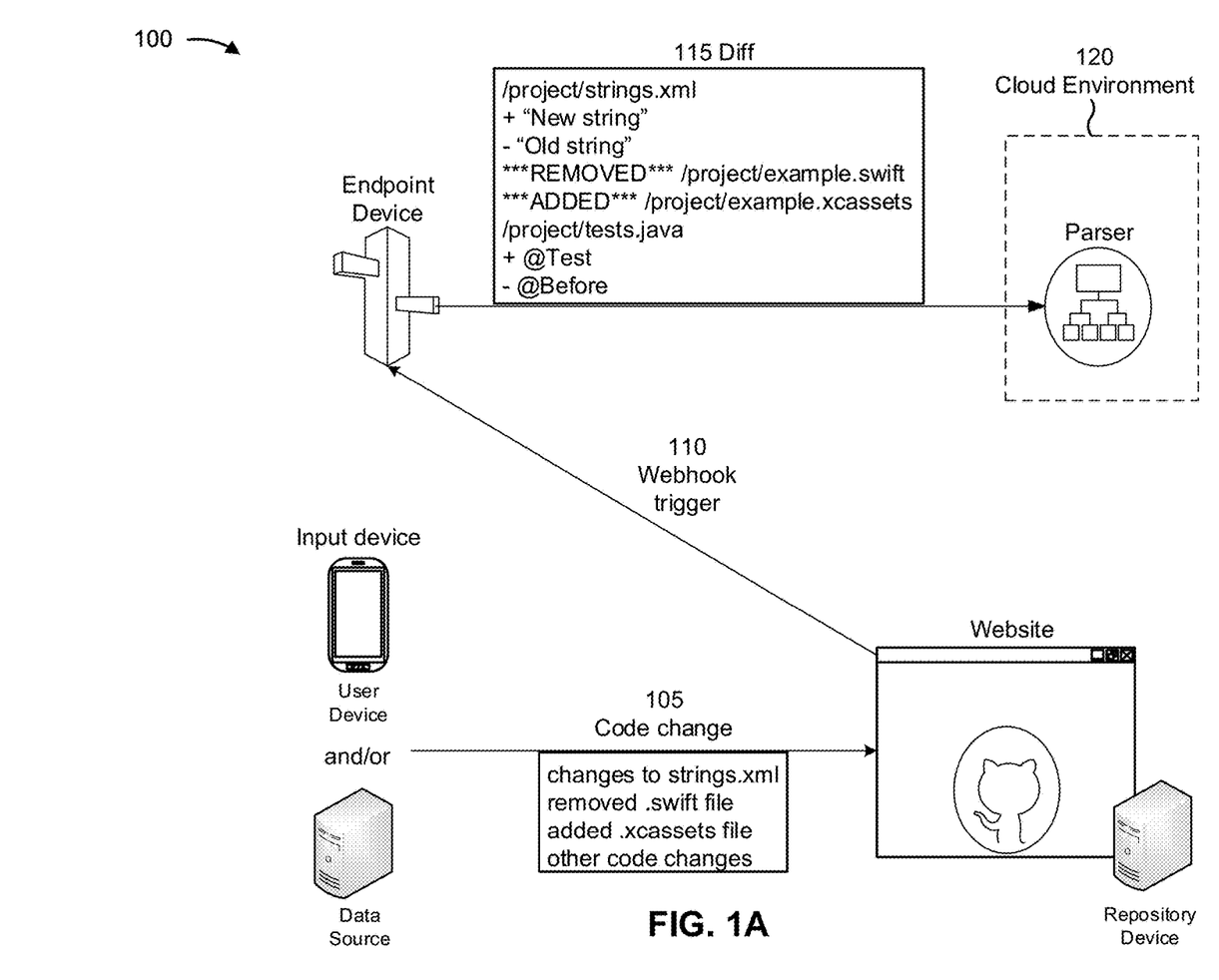
FIGS. 1A, 1B, and 1C are diagrams of an example implementation relating to dynamic review of software updates after pull requests.
Figure 1B:
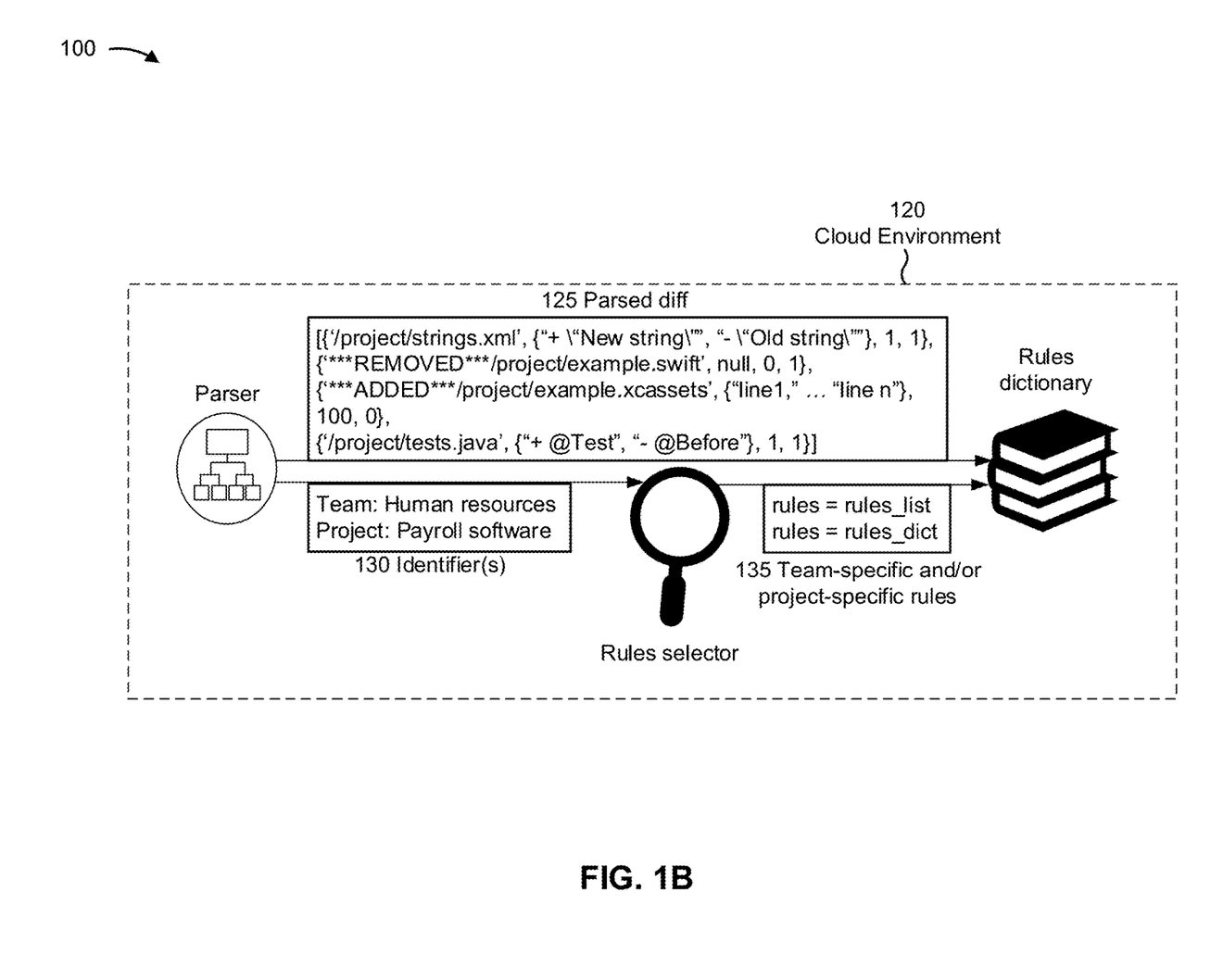
Figure 1C:
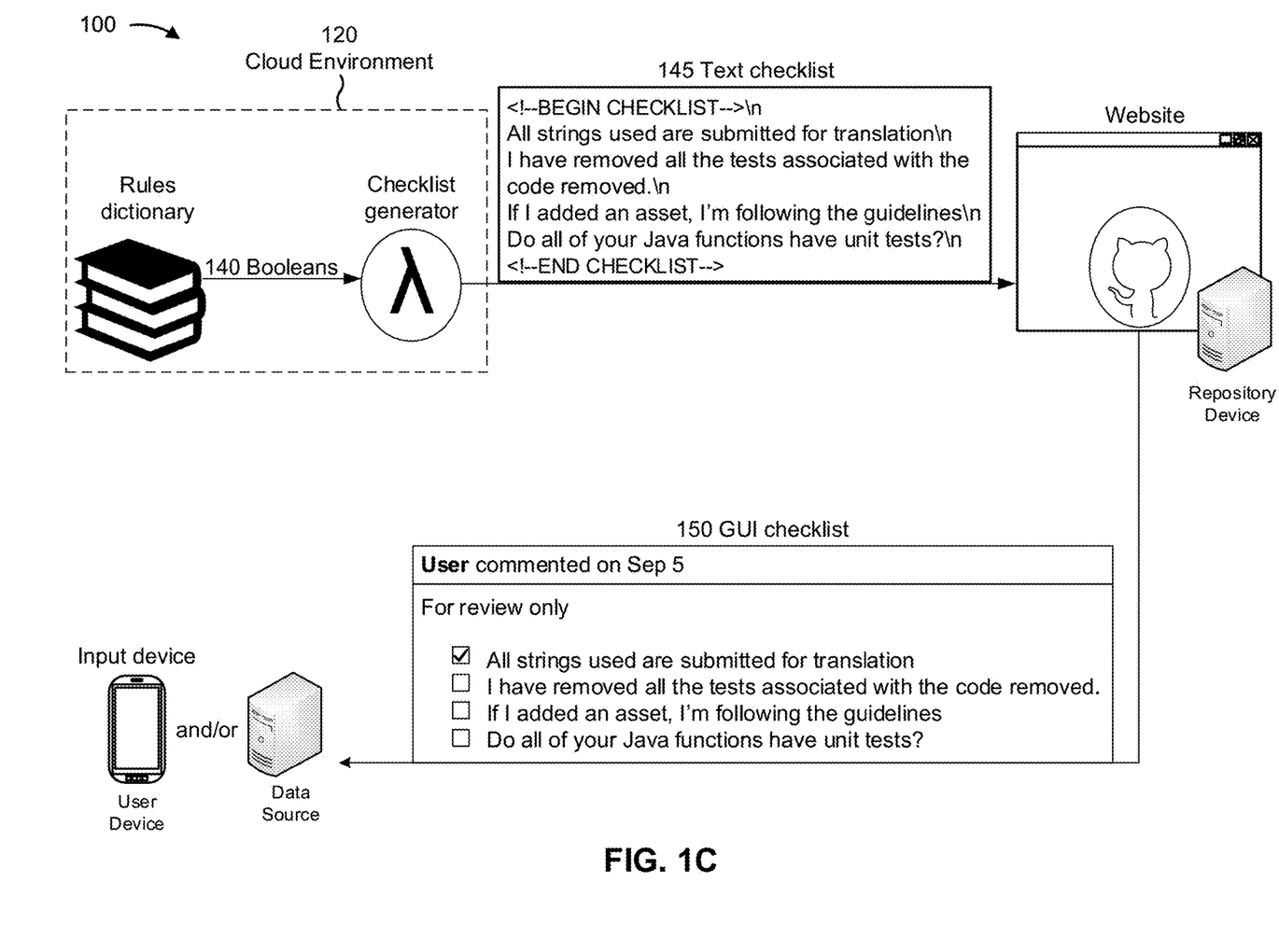

FIGS. 1A-1C are diagrams of an example 100 associated with dynamic review of software updates after pull requests. As shown in FIGS. 1A-1C, example 100 includes an input device (e.g., a user device or a data source), a repository device that stores a software repository (and, in some implementations, hosts a website that provides access to the repository), an endpoint device, and a cloud environment 120. These devices and components are described in more detail in connection with FIGS. 3 and 4. Although the description below will focus on accessing the repository device through a website (e.g., the repository device providing a hypertext transfer protocol (HTTP)-based repository), the description similarly applies to other methods of accessing the repository device, such as the repository device providing a file transfer protocol (FTP)-based repository, a cloud storage-based repository, and so on.

In some implementations, the input device may include a user device, such as a smartphone, a laptop, a desktop computer, or another similar device. Accordingly, a user may generate or otherwise store a change (e.g., at least one change), to software code, on the user device. Additionally, or alternatively, the input device may include a data source, such as a server, a cloud storage device, or another similar source of data. Accordingly, the data source may generate or otherwise store a change to software code. For example, the data source may compile changes from one or more users (e.g., via corresponding user devices) at scheduled times such that the data source stores a change, to software code, pulled from one or more user devices.

As shown by reference number 105, the input device may submit a code change, via a website, to a repository device (e.g., a server that stores a software repository). For example, the user may interact with a graphical user interface (GUI) (e.g., the website) or may otherwise instruct the input device to send (e.g., over a network), to the repository device, a change to software code. Additionally, or alternatively, the repository device may scrape or otherwise pull (e.g., at scheduled times) a change to software code from one or more user devices.

The software code may be encoded into one or more files stored on the repository device. Each file may have an associated name, an associated extension, and an associated path (e.g., '/project/filename.extension'). In any of the implementations described herein, a change to software code (a "software code change") may include an addition of one or more new files for incorporation into the software code, a removal of one or more existing files from the software code, and/or one or more changes in content (e.g., additions, removals, and/or modifications) to the software code. In example 100, the software code change includes changes in content to a file named "strings.xml," removal of a ".swift" file, addition of a ".xcassets" file, and other changes.

As shown by reference number 110, the repository device may trigger the endpoint device to provide a difference file to a parser. For example, the website may include a webhook (e.g., a web callback, an HTTP push application programming interface (API), or a reverse API) that automatically executes when the input device submits the software code change to the repository device (e.g., via the website). Upon triggering, the webhook may call an API provided by the endpoint device. Thus, the repository device that is hosting the website may transmit API parameters (e.g., in an HTTP POST request) to the endpoint device.

As shown by reference number 115, the endpoint device may provide a difference file to a parser (e.g., executing in a cloud environment 120). In example 100, the difference file indicates or encodes the content changes to the "strings.xml" file, the removal of a file named "example.swift", the addition of a file named "example.xcassets," and content changes to a file named "tests.java." In some implementations, the repository device may automatically generate the difference file (e.g., based on receiving the software code change from the input device). For example, the repository device may use a data comparison tool (such as the diff utility) to determine differences between the software code and the software code change. Additionally, the repository device may transmit the difference file to the endpoint device based on triggering of the webhook. For example, the repository device may use an HTTP POST command to send the difference file to the endpoint device (e.g., as an argument to the API provided by the endpoint device). As an alternative, the endpoint device may receive the difference file based on calling at least one API provided by the repository device. For example, the endpoint device may call a get API, provided by the repository device, one or more times. In some implementations, the repository device may generate the difference file after the API (e.g., accessed via the website) is called, rather than based on receiving the software code change from the input device.

In some implementations, the difference file may be included in a pull request provided by the repository device. For example, the pull request may include a pull request title, a pull request body, comments submitted by a user associated with the software code change, an identifier associated with the software code (e.g., a uniform resource locator (URL) and/or other similar identifier), and/or additional information associated with the software code, in addition to the difference file.

As shown in FIGS. 1A-1C, the parser may be implemented in a cloud environment 120. For example, the parser may be executed by a virtual machine hosted on one or more servers. Accordingly, the cloud environment 120 may schedule, using a load balancer, execution of the parser and may schedule, using the load balancer, execution of a checklist generator. As an alternative, the parser may be executed by a server device. In some implementations, the server device may be at least partially integrated (physically, electronically, and/or logically) with the repository device (e.g., and, in some implementations, may host the website).

As shown in FIG. 1B, and by reference number 125, the parser may provide a parsed difference file to a rules dictionary. In some implementations, the parser may determine one or more files, associated with the software code, affected by the software code change. For example, the parser may determine which lines in the difference file include a file path (e.g., by cycling through each line using a 'for' command in Python or C and/or another similar command). In some implementations, determining a file path may include checking for certain characters (e.g., a "/", a ".", and so on), checking for patterns (e.g., a file name followed by a "." and then a file extension), and/or checking for other indicators (e.g., a line starting with "diff" may indicate that the line includes a file path). In example 100, the parsed difference file includes a multi-dimensional array and encodes the determined one or more files as an initial element of each sub-array therein. In example 100, the first elements of the sub-arrays are thus '/project/strings.xml' (which indicates that "strings.xml" was changed), '*REMOVED*/project/example.swift' (which indicates that "example.swift" was removed), '*ADDED*/project/example.xcassets' (which indicates that "example.xcassets" was added), and '/project/tests.java' (which indicates that "tests.java" was changed). As shown, the parser may append (e.g., prepend) a string to a filename to indicate whether the corresponding file was added or removed. In example 100, the parser does not append a string to the filename when the corresponding file is modified, rather than added or removed. However, the parser may add a string (e.g., "*CHANGED*") to a filename to indicate that a corresponding file has been modified, in some implementations. Other examples may include different data structures other than a multi-dimensional array and/or sub-arrays, such as lists, stacks, trees, queues, and so on.

Additionally, or alternatively, the parser may determine content associated with the software code change. For example, the parser may determine which lines in the difference file include content changes (e.g., by cycling through each line using a 'for' command in Python or C and/or another similar command). In some implementations, determining a content change may include checking for certain characters (e.g., a "+", a "−", and so on), checking for patterns (e.g., a "+" followed by a string in quotation marks), and/or checking for other indicators (e.g., a line not starting with "diff" may indicate that the line includes a content change). In example 100, the parsed difference file includes a multi-dimensional array and encodes content changes, for the one or more files, as a set of strings stored within each sub-array therein. In example 100, the second elements of the sub-arrays are {"+\"New String\"", "−\"Old string\""} (which indicates that "New String" was added to "strings.xml" and "Old String" was removed from "strings.xml"), null (which indicates that the entire file "example.swift" was removed), {"line1," . . . "line n"} (which indicates that lines 1 through n of "example.xcassets" are new), and {"+@Test", "−@Before"} (which indicates that a "@Test" function was added to "tests.java" and a "@Before" function was removed from "tests.java"). Other examples may include different data structures other than a multi-dimensional array and/or sub-arrays, such as sets of character arrays, sets of line numbers that were changed, and so on.

In some implementations, the parsed difference file may include additional information. In example 100, the multi-dimensional array further encodes quantities of additions and removals, for the one or more files, as integers stored within each sub-array therein. For example, the parser may increment an addition counter when the parser identifies a line in the difference file that includes an addition, and may increment a deletion counter when the parser identifies a line in the difference file that includes a removal. In some implementations, determining an addition or a removal may include checking for certain characters (e.g., a "+" or a "−", respectively), checking for patterns (e.g., "+" followed by a string in quotation marks or a "−" followed by a string in quotation marks, respectively), and/or checking for other indicators. In example 100, "strings.xml" is associated with one addition ("New string") and one removal ("Old string"), "example.swift" is associated with one removal (the entire file), "example.xcassets" is associated with 100 additions (all lines of the new file), and "tests.java" is associated with one addition (@Test) and one removal (@Before). Other examples may include additional or alternative information. For example, the parsed difference file may encode a quantity of the one or more files that are associated with the software code change. For example, the parser may increment a counter when the parser identifies a line in the difference file that includes a file path, as described above.

In some implementations, the parser may select a rules dictionary to apply to the parsed difference file. A rules dictionary may identify one or more rules associated with software code changes. A rules dictionary may include a data structure that stores multiple rules, such as a C struct, a Python class, or any other data structure storing one or more rules. The rules may include if-then statements that output Booleans, switch expressions that output strings or other identifiers of software review checklist items, or the like. Moreover, at least two different rule dictionaries may cause generation of different software review checklist items.

In some implementations, the parser may be hard-coded to select the rules dictionary (e.g., by setting a rules variable equal to a constant data structure, such as rules_list or rules_dict). Accordingly, each project stored in the repository device (and/or each team registered to use the repository device) may have a dedicated parser that is hard-coded to select the rules dictionary corresponding to that project (and/or that team).

As an alternative, and as shown by reference number 130, the parser may provide one or more identifiers to a rules selector. For example, the parser may determine an identifier for a team associated with the software code and/or an identifier for a project associated with the software code. An identifier may include a string (such as "Human resources" and/or "Payroll software" as shown in example 100), a numeric identifier, an alphanumeric identifier, a hexadecimal identifier, or the like. In some implementations, and as explained above, the repository device may provide a pull request that includes the difference file; accordingly, the parser may extract the at least one identifier from the pull request. Accordingly, as shown by reference number 135, the rules selector may indicate which rules dictionary to use for the parsed difference file based on the one or more identifiers. In this way, custom rules can be identified and applied to different software code changes.

As shown in FIG. 1C, and by reference number 140, the rules dictionary may provide output to a checklist generator. The output may be based on applying rules (e.g., one or more rules), from the rules dictionary, to generate software review checklist items (e.g., one or more software review checklist items). In some implementations, the rules may be common across computer languages and/or contextual to one of a plurality of computer languages. For example, a rule common across languages may include a rule based on a particular file being changed, a threshold quantity of files being changed, a threshold quantity of lines being added and removed, and so on. In another example, a rule contextual to a computer language may include a rule based on particular content (e.g., a particular function) being added or removed, a file with a particular extension being added or removed, and so on.

In some implementations, applying the rules may include comparing one or more identifiers, associated with the one or more files, with one or more identifiers included in the rules. This comparison may include comparing one or more file extensions, associated with the one or more files, with one or more file extensions included in the rules, and/or comparing one or more file names, associated with the one or more files, with one or more file names included in the rules. As shown in example 100, a rule may output a checklist item when a particular file (e.g., "strings.xml") is indicated in the parsed difference file. Accordingly, the rule outputs the software checklist review item "All strings used are submitted for translation" when the rule detects that "strings.xml" has been added, changed, or removed.

As further shown in example 100, a rule may output a checklist item when a particular file extension (e.g., ".xcassets") is indicated in the parsed difference file. Accordingly, the rule outputs the software checklist review item "If I added an asset, I'm following the guidelines." when the rule detects that a file with ".xcassets" has been added, changed, or removed.

Some rules may trigger when a condition is true or may trigger when a condition is false. For example, one rule may output a checklist item when a particular file (e.g., "strings.xml") and/or a particular file extension (e.g., ".xcassets") is indicated in the parsed difference file while another rule may output a checklist item when a particular file (e.g., "FeatureConstants.java") and/or a particular file extension (e.g., ".swift") is not indicated in the parsed difference file.

Additionally, or alternatively, the comparison may include comparing one or more file identifiers, associated with one or more new files associated with the software code change, with one or more new file identifiers included in the rules, and/or comparing one or more file identifiers, associated with one or more removed files associated with the software code change, with one or more removed file identifiers included in the rules.

As further shown in example 100, a rule may output a checklist item when a particular file name and/or extension (e.g., ".swift") is indicated as removed in the parsed difference file.

Other examples may check whether a file with a particular file name and/or extension is indicated as added in the parsed difference file. Moreover, as explained above, some rules may trigger when a condition is true or may trigger when a condition is false. For example, one rule may output a checklist item when a particular file and/or a particular file extension is not indicated as added or removed in the parsed difference file while another rule may output a checklist item when a particular file and/or a particular file extension is indicated as added or removed in the parsed difference file.

Additionally, or alternatively, applying the rules may include comparing the content, associated with the software code change, with content included in the rules. This comparison may include comparing one or more function names, associated with the software code change, with one or more function names included in the one or more rules. For example, as further shown in example 100, a rule may output a checklist item when particular content (e.g., "@Test" or "@Before") is indicated as added or removed in the parsed difference file. Additionally, or alternatively, this comparison may include comparing a quantity of lines, associated with the software code change, with one or more line thresholds indicated by the rules, and/or comparing a quantity of files, associated with the software code change, with one or more file thresholds indicated by the rules. For example, a rule may output a checklist item when a threshold quantity of lines (e.g., less than 80 lines, at least 100 lines, and so on) and/or when a threshold quantity of files (e.g., at least 5 files, less than 10 files, and so on) are indicated in the parsed difference file.

Moreover, as explained above, some rules may trigger when a condition is true or may trigger when a condition is false. For example, one rule may output a checklist item when particular content is not indicated in the parsed difference file while another rule may output a checklist item when particular content is not present in the parsed difference file.

Accordingly, as described above, at least two different rule dictionaries have rules including different identifiers or different content. In some implementations, the rules may be customizable. For example, the repository device may receive the one or more rules based on input (e.g., to the website), and may update the rule dictionary to include the one or more rules. In some implementations, the repository device may receive the one or more rules as one or more scripts to implement on a back end. As an alternative, the repository device may provide a GUI (e.g., via the website) for a user to define one or more rules for which the repository device will generate one or more corresponding scripts.

As shown by reference number 145, the checklist generator may provide a text checklist to the repository device to be output via the website. In some implementations, the checklist generator may add an item (e.g., at least one item) to a preconfigured checklist and/or remove an item (e.g., at least one item) from the preconfigured checklist. Accordingly, the rules may remove items from and/or add items to the preconfigured checklist based on outcomes of the comparisons (e.g., as described above).

In some implementations, the checklist generator may retrieve the preconfigured checklist from a memory that stores multiple preconfigured checklists. For example, the parser may be hard-coded to select the checklist (e.g., by setting an "old checklist" variable equal to a constant data structure). Accordingly, each project stored in the repository device (and/or each team registered to use the repository device) may have a dedicated checklist generator that is hard-coded to select the preconfigured checklist corresponding to that project (and/or that team). As an alternative, the checklist generator may use an identifier for a team associated with the software code and/or an identifier for a project associated with the software code (e.g., extracted by the parser as described above). Accordingly, the checklist generator may select which preconfigured checklist to use based on the identifier(s).

As shown by reference number 150, the repository device may output, via the website, a GUI based on the text checklist. The repository device may provide the GUI to the input device. For example, the repository device may combine the text checklist with a GUI generated by the website, such as by inserting code into a document object model for the website. As an alternative, the checklist generator may generate the GUI and provide the same to the repository device for transmission to the user device. Additional details regarding the GUI are described below in connection with FIG. 2.

In some implementations, based on input from a user, the repository device may receive confirmation of the software code change. In some implementations, the confirmation may be based on one or more interactions with the GUI that provides the one or more software review checklist items for display. For example, the user may interact with checkboxes associated with the one or more software review checklist items. Accordingly, the repository device may commit the at least one change to the software repository based on the confirmation of the at least one change. In some implementations, the confirmation may include confirmation that the software review checklist items have been completed. For example, the repository device may require interaction with each checkbox. Accordingly, the repository device may generate and output an error message when the input from the user does not confirm the software review checklist items.

Additionally, or alternatively, the repository device may automatically call one or more APIs based on receiving the checklist. For example, the repository device may generate one or more tickets (e.g., in a tracking software, such as Jira) based on the checklist. Accordingly, the ticket(s) may indicate the software checklist review items. In some implementations, the repository device may generate a ticket for each item on the checklist. Accordingly, each ticket may be associated with a corresponding software checklist review item.

By using the techniques described above, the repository device can provide a custom checklist that is based on one or more changes to software code. Moreover, in some implementations, the repository device can require that the user confirm each item on the custom checklist because each item will be based on, and thus relevant to, the one or more changes. As a result, the repository device outputs a checklist with increased accuracy and relevance with respect to the changes and that improves the user's experience with the software repository. Additionally, in some implementations, computerized rules may further select from different rule dictionaries based on an identifier for a team associated with the software code and/or an identifier for a project associated with the software code. As a result, the repository device may automatically and accurately generate checklists for multiple teams and/or multiple projects.

As indicated above, FIGS. 1A-1C are provided as an example. Other examples may differ from what is described with regard to FIGS. 1A-1C.

Figure 2:
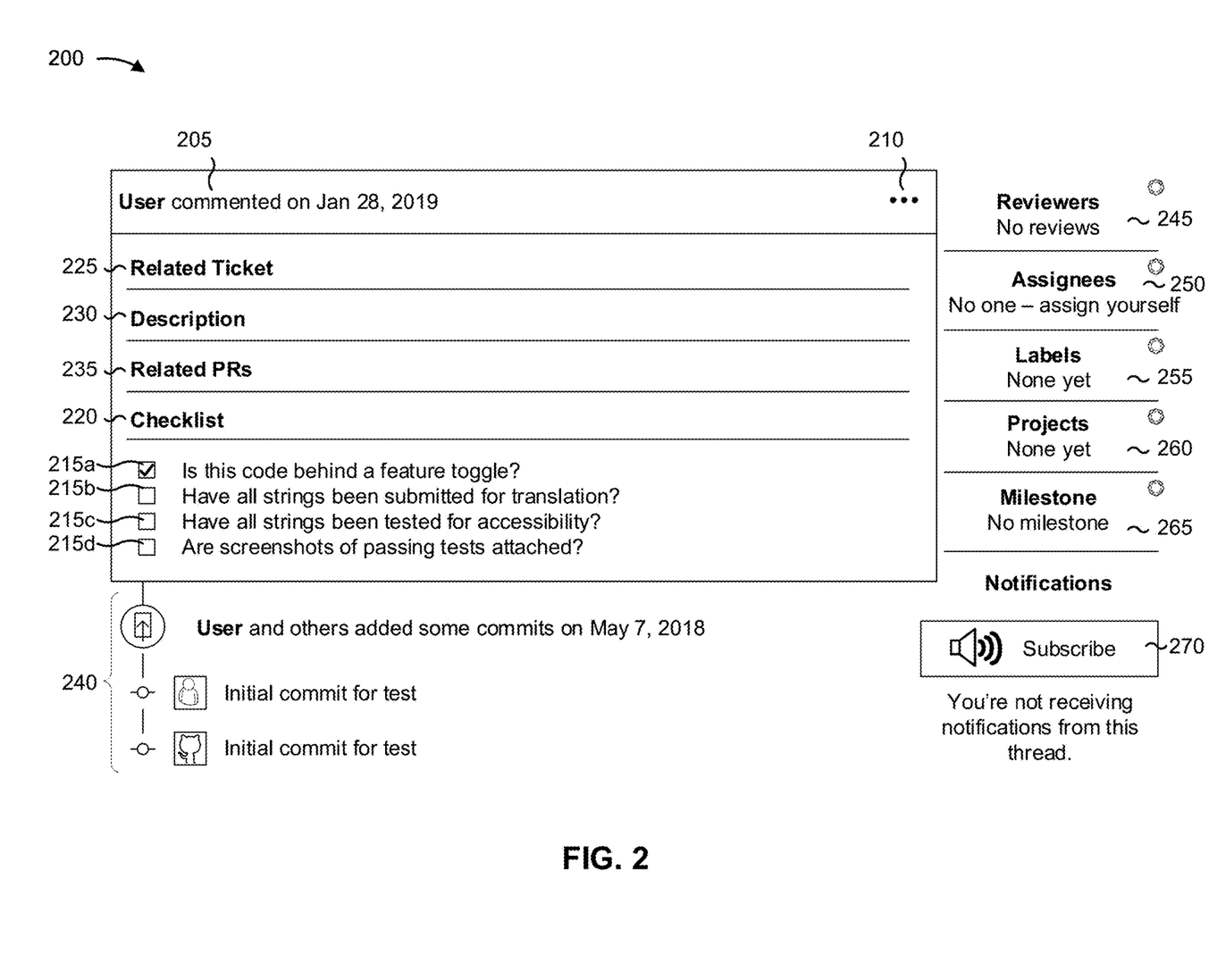
FIG. 2 is a diagram of an example graphical user interface (GUI) output by systems and/or methods described herein.

FIG. 2 is a diagram of an example graphical user interface (GUI) 200 associated with dynamic review of software updates after pull requests. For example, the GUI may be displayed when the user navigates to a website associated with a software repository. Accordingly, as described above in connection with FIGS. 1A-1C, the website may be hosted by, or otherwise in communication with, a repository device. As shown in FIG. 2, example 200 includes a title bar 205 for a project including software code as well as an ellipses 210 (and/or other button) with which a user can interact in order to display a list of options. Example 200 further includes software review checklist 220 with items 215a, 215b, 215c, and 215d (e.g., generated as described above in connection with FIGS. 1A-1C). In some implementations, items 215a, 215b, 215c, and 215d have corresponding checkboxes (and/or other buttons) with which a user can interact in order to confirm the software review checklist items.

In addition to the checklist 220, example 200 may further include related tickets 225. For example, as described above in connection with FIGS. 1A-1C, generation of software review checklist 220 may trigger creation of one or more tickets (e.g., in a tracking software, such as Jira) based on items 215a, 215b, 215c, and 215d.

In some implementations, example 200 may further include a description 230 and/or related pull requests (PRs) 235. For example, the user may input a description when uploading a change to the software code. As an alternative, the repository device may automatically generate a description of the change for display along with the software review checklist 220. Additionally, or alternatively, the user may provide input to tag pull requests related to a change. As an alternative, the repository device may automatically determine pull requests related to the change for display along with the software review checklist 220. For example, the repository device may determine pull requests associated with the same user, associated with one or more same files, and so on.

As shown in FIG. 2, example 200 may further include a history of previous changes 240 that were submitted by the same user and/or by other users. Additional information may be included in a sidebar. For example, the sidebar may indicate one or more reviewers 245 assigned to the project. In some implementations, the reviewers 245 may include other users assigned to the project. Additionally, or alternatively, the sidebar may indicate one or more assignees 250. In some implementations, the assignees 250 may include the user who submitted the change and/or other users assigned to the project. Additionally, or alternatively, the sidebar may indicate one or more labels 255. For example, the user may input one or more labels (e.g., from a preconfigured list and/or new labels) to attach to the change. Additionally, or alternatively, the sidebar may indicate one or more projects 260. In some implementations, the user may indicate one or more related projects, or the repository device may automatically determine projects related to the change for display on the sidebar. For example, the repository device may determine projects associated with the same user and so on. Additionally, or alternatively, the sidebar may indicate one or more milestones 265. In some implementations, the user may input one or more milestones (e.g., from a preconfigured list and/or new milestones) to attach to the change. Additionally, or alternatively, the sidebar may indicate one or more notifications along with a button 270 to subscribe. Accordingly, by subscribing, the user may receive an email, a text message, or other communication each time a change is submitted to the project.

As indicated above, FIG. 2 is provided as an example. Other examples may differ from what is described with regard to FIG. 2.

Figure 3:
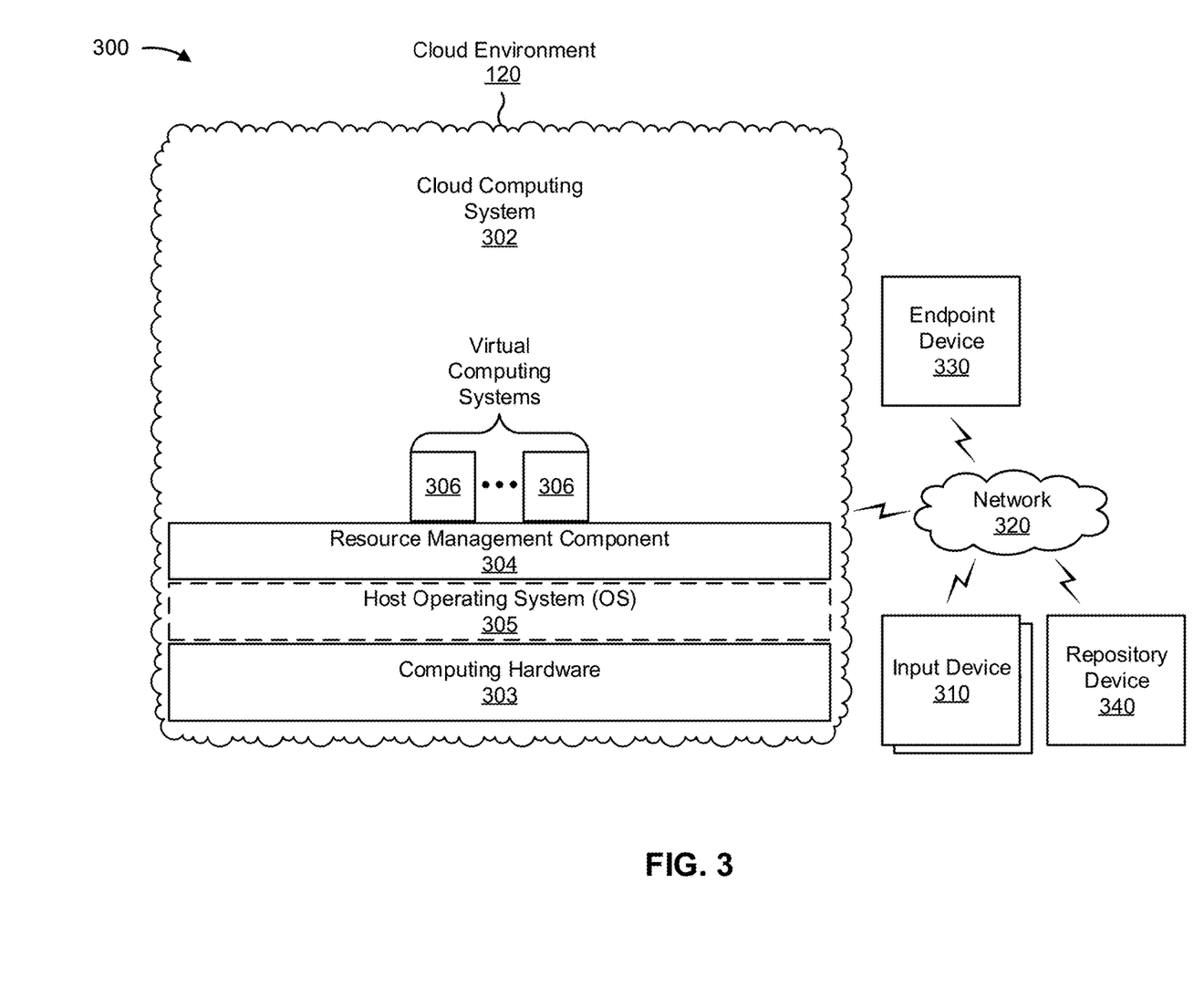
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a cloud environment 120, which may include one or more elements of and/or may execute within a cloud computing system 302. The cloud computing system 302 may include one or more elements 303-306, as described in more detail below. As further shown in FIG. 3, environment 300 may include an input device 310, a network 320, an endpoint device 330, and/or a repository device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. Examples of computing hardware are described elsewhere herein (e.g., with respect to FIG. 4).

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines. Additionally, or alternatively, the resource management component 304 may include a container manager, such as when the virtual computing systems 306 are containers. In some implementations, the resource management component 304 executes within and/or in coordination with a host operating system 305.

A virtual computing system 306 includes a virtual environment that enables cloud-based execution of operations and/or processes described herein using computing hardware 303. A virtual computing system 306 may execute one or more applications using a file system that includes binary files, software libraries, and/or other resources required to execute applications on a guest operating system (e.g., within the virtual computing system 306) or the host operating system 305.

Although the cloud environment 120 may include one or more elements 303-306 of the cloud computing system 302, may execute within the cloud computing system 302, and/or may be hosted within the cloud computing system 302, in some implementations, the cloud environment 120 may not be cloud-based (e.g., may be implemented outside of a cloud computing system) or may be partially cloud-based. For example, the cloud environment 120 may include one or more devices that are not part of the cloud computing system 302, such as device 400 of FIG. 4, which may include a standalone server or another type of computing device. The cloud environment 120 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The input device 310 may include one or more devices capable of receiving, generating, storing, processing, and/or providing changes to software code. The input device 310 may include a communication device and/or a computing device. For example, the input device 310 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Additionally, or alternatively, the input device 310 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The input device 310 may transmit at least one change to software code (e.g., to repository device 340) and receive a software review checklist in response. Additionally, or alternatively, the input device 310 may transmit confirmation of the at least one change to trigger the repository device 340 to commit the at least one change, as described elsewhere herein.

The endpoint device 330 may be implemented on a cloud computing system at least partially integrated with cloud computing system 302 (e.g., as computing hardware 303) or distinct from cloud computing system 302 (e.g., as a standalone server). In some implementations, the endpoint device 330 may include one or more devices (e.g., one or more servers) that are not part of a cloud computing system, such as device 400 of FIG. 4, which may include a standalone server or another type of computing device. The endpoint device 330 may receive a pull request (e.g., from repository device 340) and trigger dynamic checklist generation, as described elsewhere herein.

The repository device 340 may be implemented on a cloud computing system at least partially integrated with cloud computing system 302 (e.g., as computing hardware 303) or distinct from cloud computing system 302 (e.g., as a standalone server). In some implementations, the repository device 340 may include one or more devices (e.g., one or more servers) that are not part of a cloud computing system, such as device 400 of FIG. 4, which may include a standalone server or another type of computing device. The repository device 340 may receive and store software code, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
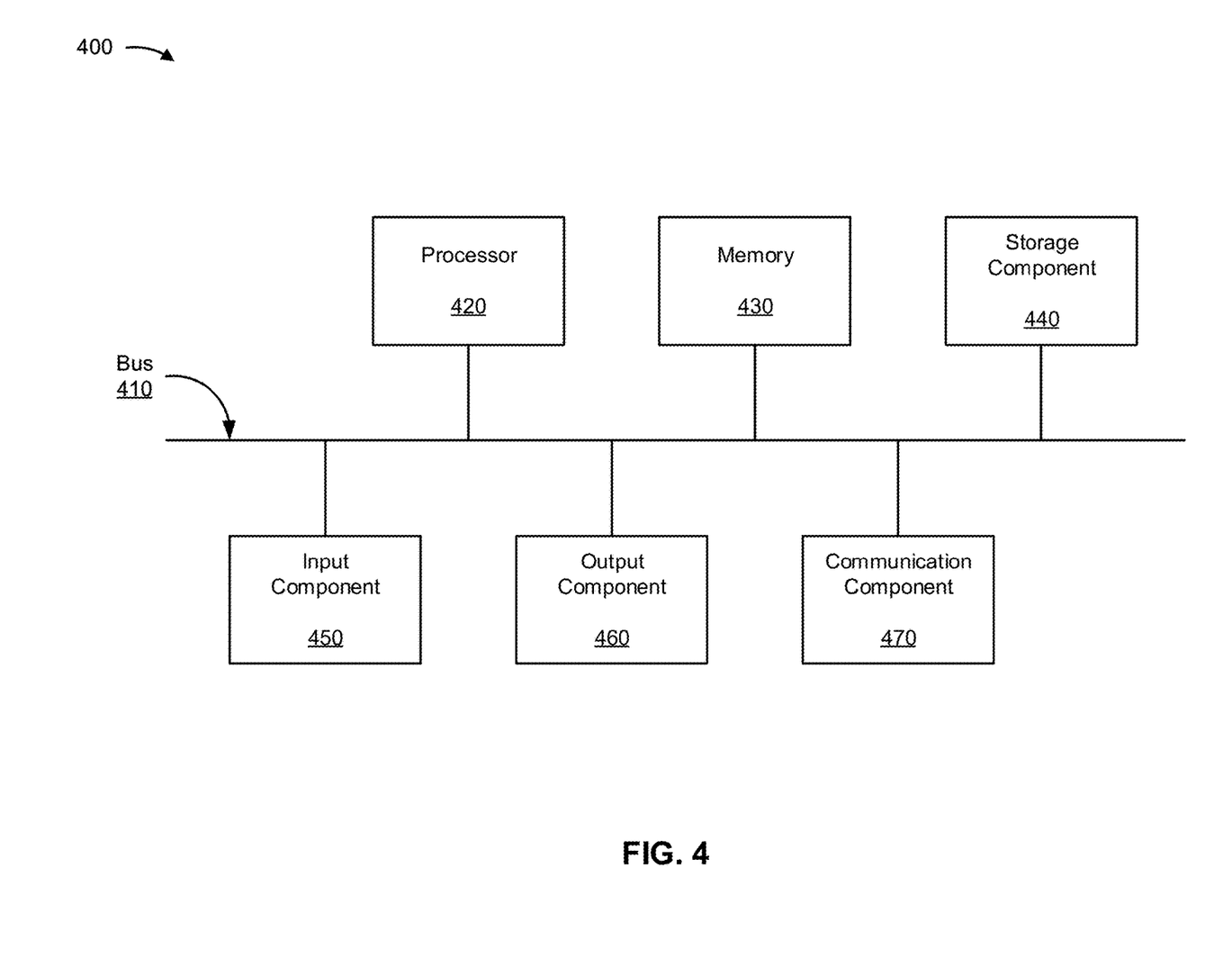
FIG. 4 is a diagram of example components of one or more devices of FIG. 3.

FIG. 4 is a diagram of example components of a device 400, which may correspond to input device 310, endpoint device 330, and/or repository device 340. In some implementations, input device 310, endpoint device 330, and/or repository device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
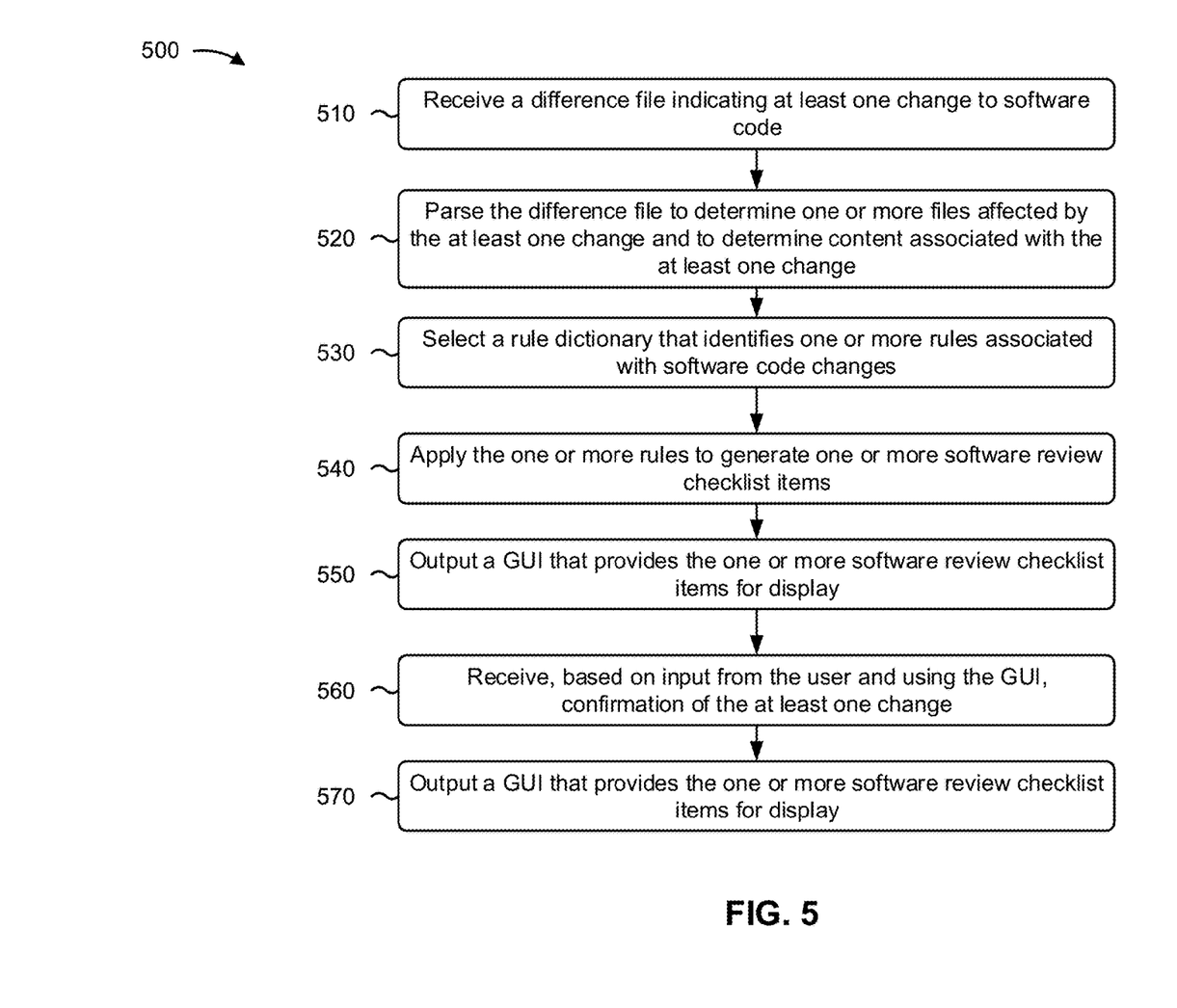
FIG. 5 is a flowchart of an example process relating to dynamically reviewing software updates after pull requests.

FIG. 5 is a flowchart of an example process 500 associated with dynamic review of software updates after pull requests. In some implementations, one or more process blocks of FIG. 5 may be performed by a system (e.g., cloud environment 120). In some implementations, one or more process blocks of FIG. 5 may be performed by another device or a group of devices separate from or including the system, such as input device 310, endpoint device 330, and/or repository device 340. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, from a software repository, a difference file indicating at least one change, to software code, that was submitted to the software repository (block 510). As further shown in FIG. 5, process 500 may include parsing the difference file to determine one or more files, associated with the software code, affected by the at least one change and to determine content associated with the at least one change (block 520). As further shown in FIG. 5, process 500 may include selecting a rule dictionary that identifies one or more rules associated with software code changes (block 530). As further shown in FIG. 5, process 500 may include applying the one or more rules to generate one or more software review checklist items (block 540). For example, applying the one or more rules may be based on comparing one or more identifiers, associated with the one or more files, with one or more identifiers included in the one or more rules and based on comparing the content, associated with the at least one change, with content included in the one or more rules, wherein at least two different rule dictionaries have rules including different identifiers or different content. In some implementations, at least two different rule dictionaries cause generation of different software review checklist items. As further shown in FIG. 5, process 500 may include outputting a GUI that provides the one or more software review checklist items for display (block 550). As further shown in FIG. 5, process 500 may include receiving, based on input from a user and using the GUI, confirmation of the at least one change (block 560). As further shown in FIG. 5, process 500 may include committing the at least one change to the software repository based on the confirmation of the at least one change (block 570).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of rule-based review of software code changes, comprising:
   parsing, by a device, a difference file included in a pull request to determine one or more files, associated with software code, affected by at least one change, based on determining a change in one or more filenames identified in the software code based on association with a file extension;
   extracting, by the device, at least one identifier, associated with the one or more files, from the pull request;
   applying, by the device, one or more rules, based on comparing the at least one identifier with one or more other identifiers identified in the one or more rules, to generate one or more software review checklist items,
      wherein comparing the at least one identifier with the one or more identifiers identified in the one or more rules comprises comparing a first set of filenames, of the one or more filenames, with a second set of filenames included in the one or more rules, and
      wherein applying the one or more rules outputs particular software review checklist items, of the one or more software review checklist items, based on comparing the first set of filenames with the second set of filenames; and
   outputting, by the device, a graphical user interface (GUI) that provides the one or more software review checklist items for display.

2. The method of claim 1, wherein the difference file indicates one or more of:
   content changes to the one or more files,
   a removal of a file of the one or more files, or an addition of a file of the one or more files.

3. The method of claim 1, wherein parsing the difference file comprises:
   appending a string to a filename, of the one or more filenames, based on determining the change in the one or more filenames.

4. The method of claim 1, wherein the one or more rules are selected based on selecting a rules dictionary based on the at least one identifier.

5. The method of claim 1, further comprising:
   receiving the pull request from a repository device.

6. The method of claim 1, further comprising:
   committing at least one change based on receiving confirmation of the at least one change.

7. The method of claim 1, wherein outputting the GUI comprises:
   outputting the GUI based on inserting code into a document object model for a website.

8. A device, comprising:
   one or more memories; and
   one or more processors, coupled to the one or more memories, configured to:
   parse a difference file included in a pull request to determine one or more files, associated with software code, affected by at least one change, based on determining a change in one or more filenames identified in the software code based on association with a file extension;
   extract at least one identifier, associated with the one or more files, from the pull request;
   apply one or more rules, based on comparing the at least one identifier with one or more other identifiers identified in the one or more rules, to generate one or more software review checklist items,
      wherein comparing the at least one identifier with the one or more identifiers identified in the one or more rules comprises comparing a first set of filenames, of the one or more filenames, with a second set of filenames included in the one or more rules, and
      wherein applying the one or more rules outputs particular software review checklist items, of the one or more software review checklist items, based on comparing the first set of filenames with the second set of filenames; and
   output a graphical user interface (GUI) that provides the one or more software review checklist items for display.

9. The device of claim 8, wherein the difference file indicates one or more of:
   content changes to the one or more files,
   a removal of a file of the one or more files, or an addition of a file of the one or more files.

10. The device of claim 8, wherein the one or more processors, to parse the difference file, are configured to:
    append a string to a filename, of the one or more filenames, based on determining the change in the one or more filenames.

11. The device of claim 8, wherein the one or more rules are selected based on selecting a rules dictionary based on the at least one identifier.

12. The device of claim 8, wherein the one or more processors are further configured to:
    receive the pull request from a repository device.

13. The device of claim 8, wherein the one or more processors are further configured to:
    commit at least one change based on receiving confirmation of the at least one change.

14. The device of claim 8, wherein the one or more processors, to output the GUI, are configured to:
    output the GUI based on inserting code into a document object model for a website.

15. A non-transitory computer-readable medium storing a set of instructions, the set of instructions comprising:
    one or more instructions that, when executed by one or more processors of a device, cause the device to:

parse a difference file included in a pull request to determine one or more files, associated with software code, affected by at least one change, based on determining a change in one or more filenames identified in the software code based on association with a file extension;

extract at least one identifier, associated with the one or more files, from the pull request;

apply one or more rules, based on comparing the at least one identifier with one or more other identifiers identified in the one or more rules, to generate one or more software review checklist items, wherein comparing the at least one identifier with the one or more identifiers identified in the one or more rules comprises comparing a first set of filenames, of the one or more filenames, with a second set of filenames included in the one or more rules, and wherein applying the one or more rules outputs particular software review checklist items, of the one or more software review checklist items, based on comparing the first set of filenames with the second set of filenames; and output a graphical user interface (GUI) that provides the one or more software review checklist items for display.

16. The non-transitory computer-readable medium of claim 15, wherein the difference file indicates one or more of:
content changes to the one or more files,
a removal of a file of the one or more files, or an addition of a file of the one or more files.

17. The non-transitory computer-readable medium of claim 15, wherein the one or more instructions, that cause the device to parse the difference file, cause the device to:
append a string to a filename, of the one or more filenames, based on determining the change in the one or more filenames.

18. The non-transitory computer-readable medium of claim 15, wherein the one or more rules are selected based on selecting a rules dictionary based on the at least one identifier.

19. The non-transitory computer-readable medium of claim 15, wherein the one or more instructions further cause the device to:
commit at least one change based on receiving confirmation of the at least one change.

20. The non-transitory computer-readable medium of claim 15, wherein the one or more instructions, that cause the device to output the GUI, cause the device to:
output the GUI based on inserting code into a document object model for a website.

* * * * *